(12) United States Patent
Pan et al.

(10) Patent No.: US 10,469,181 B2
(45) Date of Patent: Nov. 5, 2019

(54) HIGH DENSITY LOW COST WIDEBAND PRODUCTION RF TEST INSTRUMENT ARCHITECTURE

(71) Applicant: Intel Corporation, Santa Clara, CA (US)

(72) Inventors: Jin Pan, Portland, OR (US); Erkan Acar, Hillsboro, OR (US); Stephen S. Sturges, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/993,890

(22) Filed: May 31, 2018

(65) Prior Publication Data

US 2018/0351662 A1 Dec. 6, 2018

Related U.S. Application Data

(60) Provisional application No. 62/514,331, filed on Jun. 2, 2017.

(51) Int. Cl.
*H04B 17/00* (2015.01)
*H04B 17/15* (2015.01)
*H04B 17/29* (2015.01)

(52) U.S. Cl.
CPC ............ *H04B 17/15* (2015.01); *H04B 17/29* (2015.01)

(58) Field of Classification Search
CPC ........ H04B 17/15; H04B 17/29; H04B 17/16; H04B 17/18
USPC ...................................................... 455/67.11
See application file for complete search history.

(56) References Cited

U.S. PATENT DOCUMENTS

| | | | | |
|---|---|---|---|---|
| 3,427,536 A | * | 2/1969 | Wainwright | G01R 13/30 324/604 |
| 7,167,682 B1 | * | 1/2007 | Madsen | H04B 17/15 455/115.1 |
| 2010/0151808 A1 | * | 6/2010 | Toncich | H02J 7/025 455/226.3 |
| 2014/0070857 A1 | * | 3/2014 | Huang | H03L 7/081 327/156 |
| 2015/0031118 A1 | * | 1/2015 | Unkrich | G01N 29/022 435/287.9 |
| 2018/0034562 A1 | * | 2/2018 | Foegelle | H04B 17/364 |
| 2018/0351662 A1 | * | 12/2018 | Pan | H04B 17/15 |

* cited by examiner

*Primary Examiner* — Edward F Urban
*Assistant Examiner* — Max Mathew
(74) *Attorney, Agent, or Firm* — Schwegman Lundberg & Woessner, P.A.

(57) ABSTRACT

A test apparatus and method of testing a DUT are described. The apparatus includes a receiver and transmitter path each having a pair of switches that switch between a bypass position and a direct position. The bypass position is used for low frequency signals communicated through the apparatus. The direct position allows higher frequency signals to be double converted by upconversion to an IF signal and bandpass filtered before being downconverted to a predetermined frequency. Both variable and fixed LO signals are used to convert the double converted signals so that the same IF may be used independent of the higher frequency signal received or transmitted. Bandpass filtering is applied before and after amplification of the IF signal. Lowpass filtering before and after the double conversion use LPFs of different cutoff frequencies.

20 Claims, 7 Drawing Sheets

HIGH DENSITY LOW COST WIDEBAND PRODUCTION RF TEST INSTRUMENT ARCHITECTURE

PRIORITY CLAIM

This application claims the benefit of priority under 35 U.S.C. 119€ to U.S. Provisional Patent Application Ser. No. 62/514,331, filed Jun. 2, 2017, which is incorporated herein by reference in its entirety.

TECHNICAL FIELD

Embodiments described herein generally relate to wireless communication including cellular and wireless local area network (WLAN) networks, including Third Generation Partnership Project Long Term Evolution (3GPP LTE) networks and LTE advanced (LTE-A) networks as well as $4^{th}$ generation (4G) networks and $5^{th}$ generation (5G) networks. In particular embodiments described herein generally relate to generation and analysis of 5G radio frequency (RF) signals.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. As a result, 3GPP LTE systems continue to develop, with the next generation wireless communication system, 5G, to improve access to information and data sharing. 5G looks to provide a unified network/system that is able to meet vastly different and sometime conflicting performance dimensions and services driven by disparate services and applications while maintaining compatibility with legacy UEs and applications.

Prior to release to the public, wireless communication devices may undergo a rigorous set of testing procedures. For each network generation, the device testing has become increasingly complex, time consuming and expensive. It may be beneficial to mitigate the increase in at least one of the costs associated with testing.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
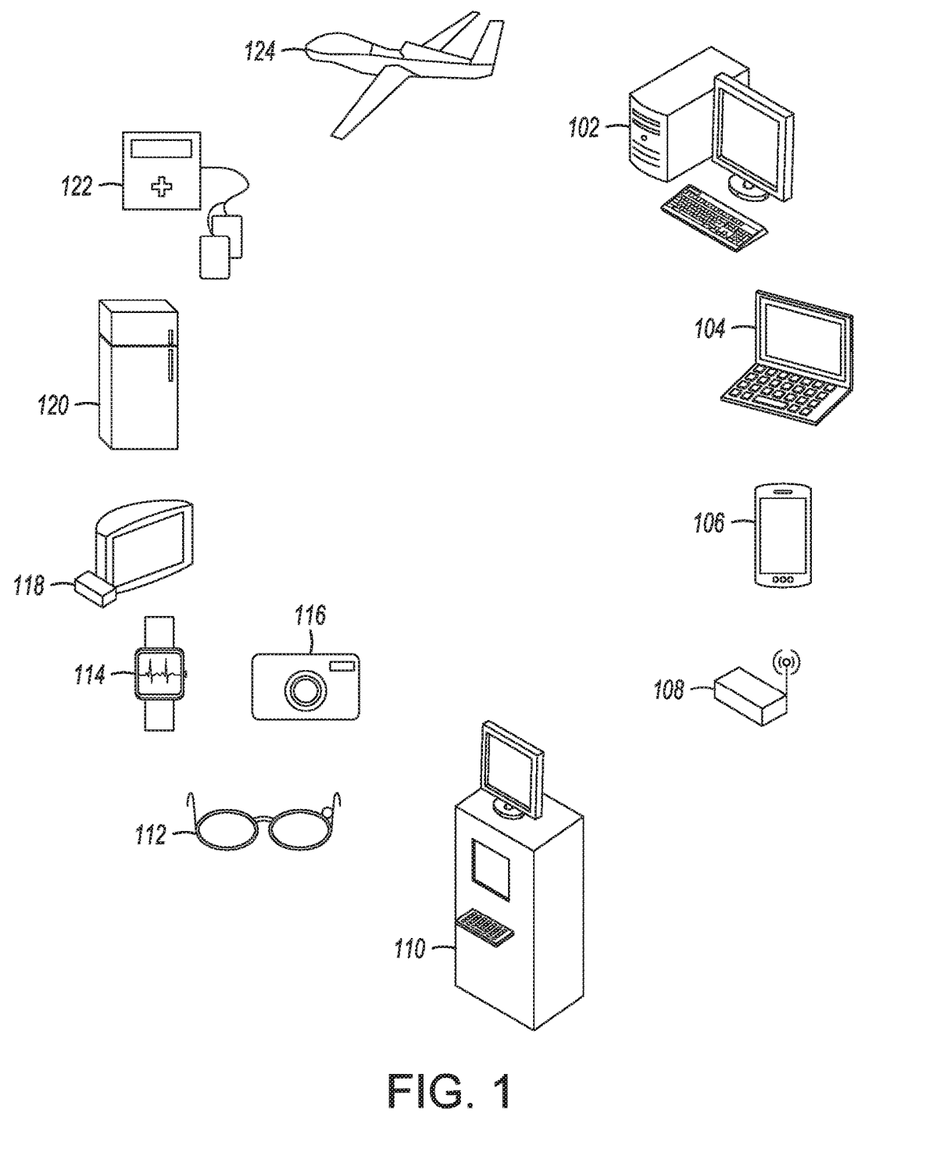
FIG. 1 is a high-level diagram illustrating examples of various types of computing platforms on which various embodiments may be implemented according to some embodiments.

FIG. 1 is a high-level diagram illustrating some examples of various types of computing platforms, each of which may constitute P or V. The computing platforms include servers or personal computers, such as PC 102, laptop 104, smartphone/tablet 106, and the like. Other types of information devices, such as networking appliance 108, which represents a switch, router, access point, etc., are computing platforms that are also contemplated. Industrial equipment 110, such as control systems, automated tooling, motor/robotics controls, programmable logic controllers, are also types of computing platforms on which aspects of the embodiments may be implemented. Computing platforms may also be implemented as consumer-electronic devices, such as smart glasses 112, smartwatch 114, digital camera 116, and media device 118, such as a set-top box as depicted, audio playback system, etc. Appliance 120 may also contain a computing system such as, for instance, an Internet-of-Things (IoT) node. Medical device 122 may contain an embedded computing platform. Likewise vehicle 124 may also contain one or more computing platforms. Each computing platform may include a processor-based system, e.g., a machine capable of executing instructions (sequential or otherwise) that specify actions to be taken by that machine.

Figure 2:
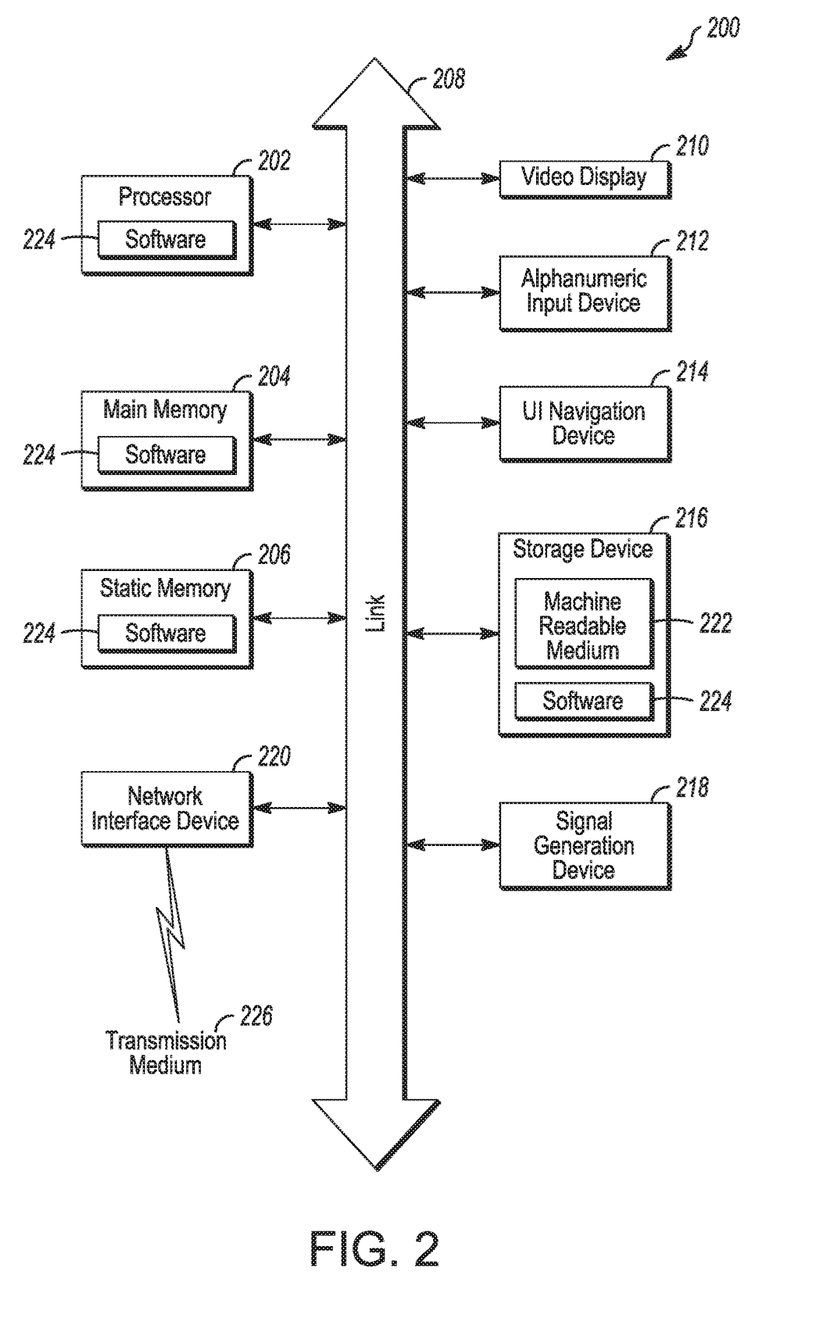
FIG. 2 is a block diagram illustrating a computer system in the example form of a general-purpose machine.

FIG. 2 is a block diagram illustrating a computer system in the example form of a general-purpose machine. In certain embodiments, programming of the computer system according to one or more particular algorithms produces a special-purpose machine upon execution of that programming. In a networked deployment, the computer system may operate in the capacity of either a server or a client machine in server-client network environments, or it may act as a peer machine in peer-to-peer (or distributed) network environments.

Example computer system includes at least one processor (e.g., a central processing unit (CPU), a graphics processing unit (GPU) or both, processor cores, compute nodes, etc.), a main memory and a static memory, which communicate with each other via a link (e.g., bus). The computer system may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory, static memory, and/or within the processor during execution thereof by the computer system, with the main memory, static memory, and the processor also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor via link. In one example, link includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
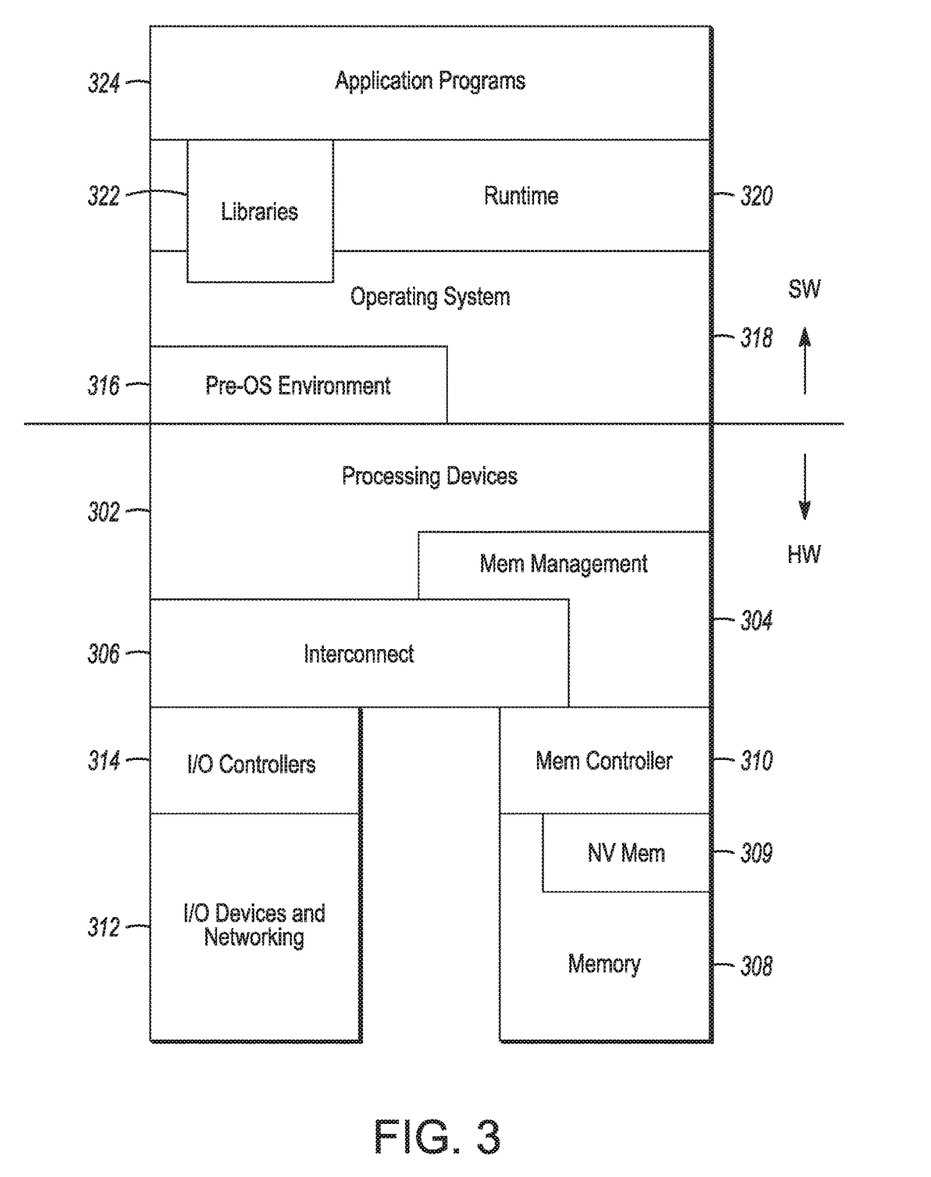
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
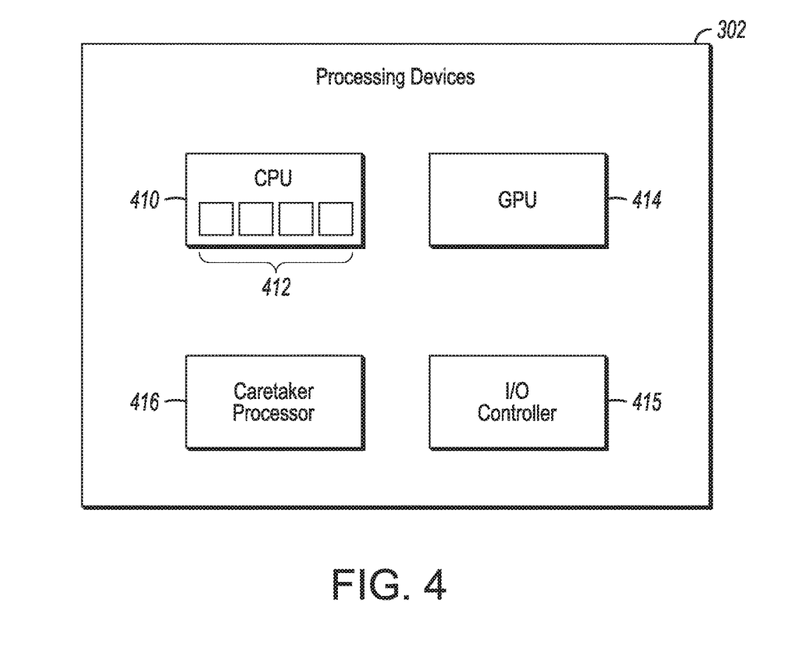
FIG. 4 is a block diagram illustrating examples of processing devices that may be implemented on a computer system, such as the computer system described with reference to FIGS. 2-3, according to some embodiments.

FIG. 4 is a block diagram illustrating processing devices 302 according to some embodiments. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be an x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

Figure 5:
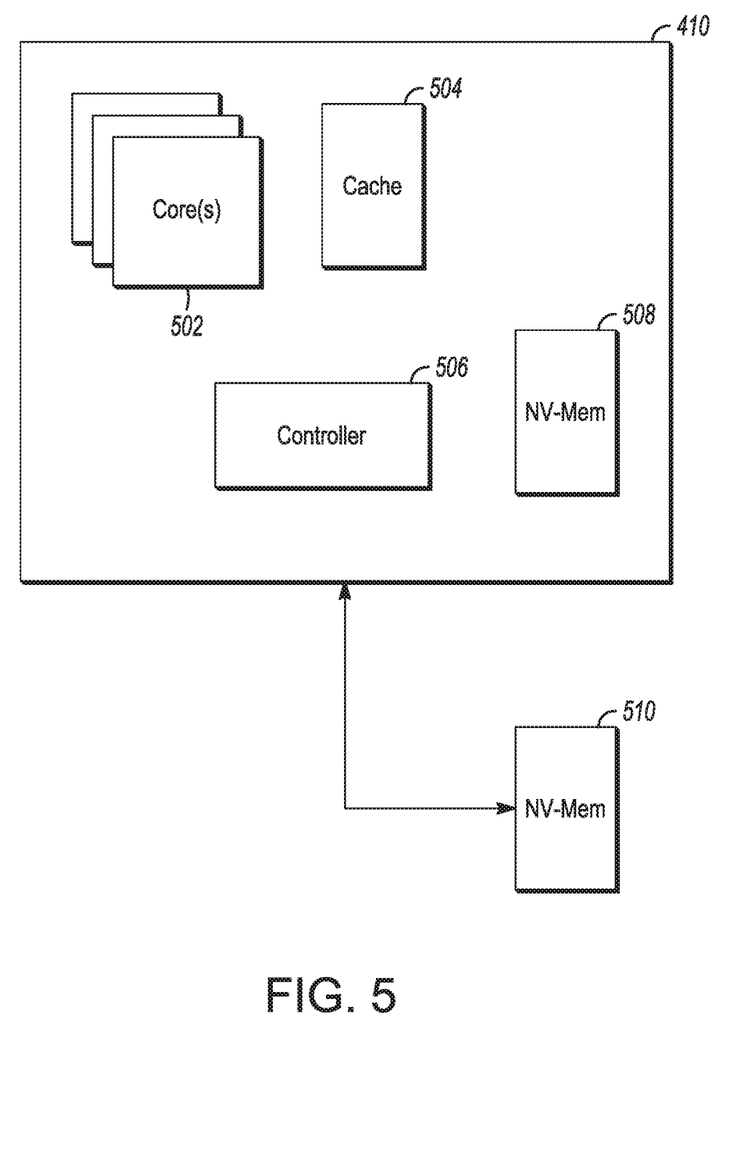
FIG. 5 is a block diagram illustrating example components of a CPU as one of the processing devices depicted in FIG. 4, according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect. In one embodiment, all of the example components of CPU 410 are formed on a common semiconductor substrate.

CPU 410 includes non-volatile memory 508 (e.g., flash, EEPROM, etc.) for storing certain portions of foundational code, such as initialization instructions, and microcode. Also, CPU 410 may be interfaced with an external (e.g., formed on a separate IC) non-volatile memory device 510 that stores foundational code that is launched by the initialization instructions, such as system BIOS or UEFI code.

Figure 6:
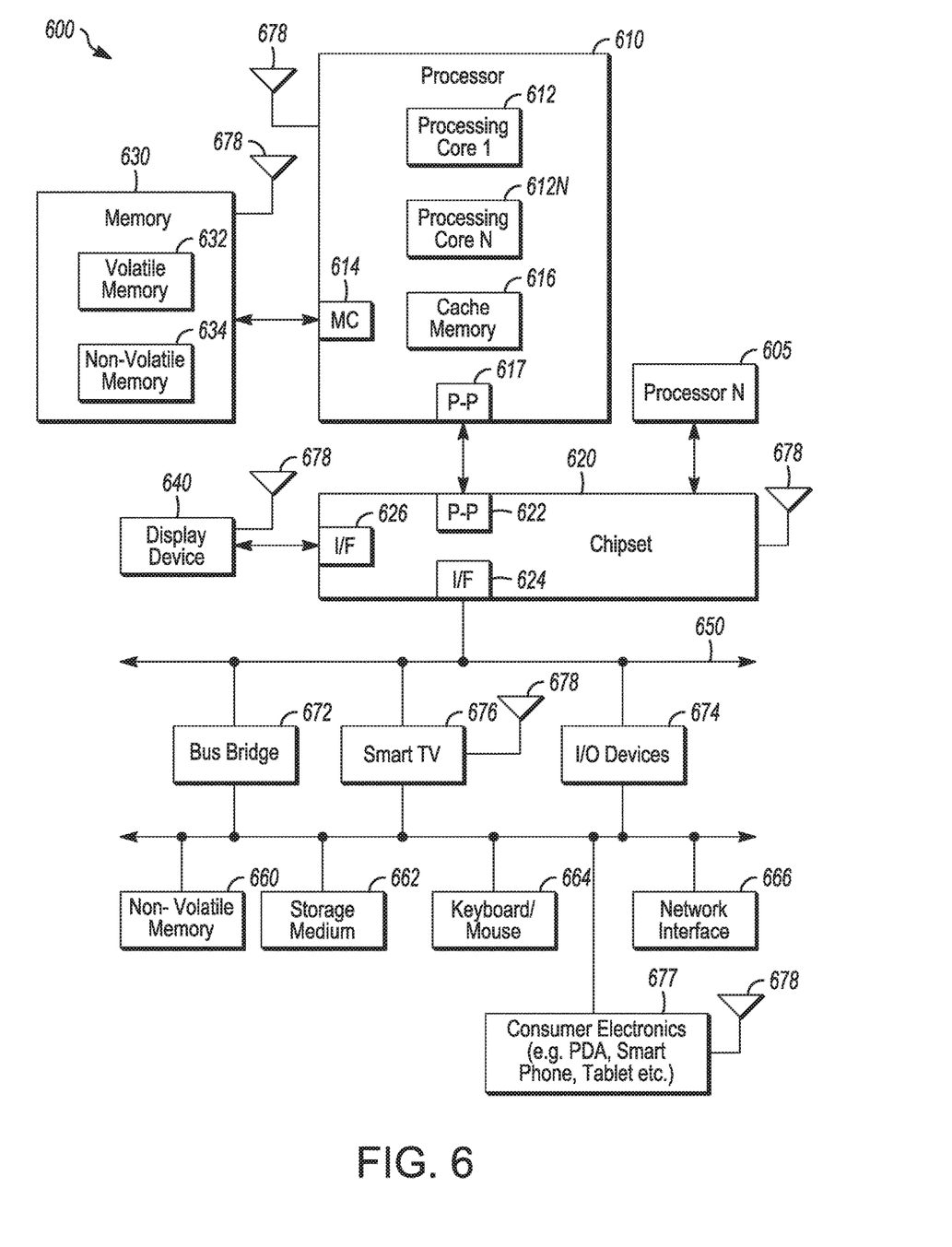
FIG. 6 shows a block diagram of an electronic device with shielding in accordance with some embodiments.

FIG. 6 shows a block diagram of an electronic device with shielding in accordance with some embodiments. FIG. 6 illustrates a system level diagram that includes an electronic device (e.g., system) having a structure and/or formed by the methods described herein. In one embodiment, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 is a system on a chip (SOC) system.

In one embodiment, processor 610 has one or more processor cores 612 and 612N, where 612N represents the Nth processor core inside processor 610 where N is a positive integer. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, an interface for wireless antenna 678 operates in accordance with the 3GPP and/or IEEE 802.11 standard protocol, Home Plug AV (HPAV), Ultra Wide Band (UWB), Bluetooth, WiMax, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. Chipset 620 enables processor 610 to connect to other elements in system 600. In some embodiments of the example system, interfaces 617 and 622 operate in accordance with a PtP communication protocol such as the Intel® QuickPath Interconnect (QPI) or the like. In other embodiments, a different interconnect may be used.

In some embodiments, chipset 620 is operable to communicate with processor 610, 605N, display device 640, and other devices, including a bus bridge 672, a smart TV 676, I/O devices 674, nonvolatile memory 660, a storage medium (such as one or more mass storage devices) 662, a keyboard/mouse 664, a network interface 666, and various forms of consumer electronics 677 (such as a PDA, smart phone, tablet etc.), etc. In one embodiment, chipset 620 couples with these devices through an interface 624. Chipset 620 may also be coupled to a wireless antenna 678 to communicate with any device configured to transmit and/or receive wireless signals.

Chipset 620 connects to display device 640 via interface 626. Display 640 may be, for example, a liquid crystal display (LCD), a light emitting diode (LED) array, an organic light emitting diode (OLED) array, or any other form of visual display device. In some embodiments of the example system, processor 610 and chipset 620 are merged into a single SOC. In addition, chipset 620 connects to one or more buses 650 and 655 that interconnect various system elements, such as I/O devices 674, nonvolatile memory 660, storage medium 662, a keyboard/mouse 664, and network interface 666. Buses 650 and 655 may be interconnected together via a bus bridge 672.

In one embodiment, mass storage device 662 includes, but is not limited to, a solid state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the 3GPP standard and its related family, the IEEE 802.11 standard and its related family, Home Plug AV (HPAV), Ultra Wide Band (UWB), Bluetooth, WiMax, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) can be incorporated into processor core 612.

The UE shown in FIGS. 1-6 may communicate with a radio access network (RAN) (e.g., E-UTRAN or evolved universal terrestrial radio access network) and core network (e.g., evolved packet core (EPC)). The core network may include a mobility management entity (MME), serving gateway (serving GW), and packet data network gateway (PDN GW). The RAN may include evolved node Bs (eNBs) (which may operate as base stations) for communicating with the UE. The eNBs may include macro eNBs and low power (LP) eNBs.

The UE may be a stationary, non-mobile device or may be a mobile device. In some embodiments, the UE may include application circuitry, baseband circuitry, Radio Frequency (RF) circuitry, front-end module (FEM) circuitry and one or more antennas. At least some of the baseband circuitry, RF circuitry, and FEM circuitry may form a transceiver. The application or processing circuitry may include one or more application processors such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry may include circuitry such as, but not limited to, one or more single-core or multi-core processors. The baseband circuitry may include one or more baseband processors and/or control logic to process baseband signals received from a receive signal path of the RF circuitry and to generate baseband signals for a transmit signal path of the RF circuitry. Baseband processing circuitry may interface with the application circuitry for generation and processing of the baseband signals and for controlling operations of the RF circuitry. For example, in some embodiments, the baseband circuitry may include a second generation (2G) baseband processor, third generation (3G) baseband processor, fourth generation (4G) baseband processor, and/or other baseband processor(s) for other existing generations, generations in development or to be developed in the future (e.g., 5G, etc.). The baseband circuitry (e.g., one or more of baseband processors) may handle various radio control functions that enable communication with one or more radio networks via the RF circuitry. The radio control functions may include, but are not limited to, signal modulation/demodulation, encoding/decoding, radio frequency shifting, etc. In some embodiments, modulation/demodulation circuitry of the baseband circuitry may include FFT, precoding, and/or constellation mapping/demapping functionality. In some embodiments, encoding/decoding circuitry of the baseband circuitry may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) of the baseband circuitry may be configured to run elements of the protocol stack for signaling of the PHY, MAC, RLC, PDCP and/or RRC layers. In some embodiments, the baseband circuitry may include one or more audio digital signal processor(s) (DSP). The audio DSP(s) may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry and the application circuitry may be implemented together such as, for example, on a system on a chip (SOC).

In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry may enable communication with wireless networks using modulated electromagnetic radiation through a non-solid medium. In various embodiments, the RF circuitry may include switches, filters, amplifiers, etc. to facilitate the communication with the wireless network. RF circuitry may include a receive signal path which may include circuitry to down-convert RF signals received from the FEM circuitry and provide baseband signals to the baseband circuitry. RF circuitry may also include a transmit signal path which may include circuitry to up-convert baseband signals provided by the baseband circuitry and provide RF output signals to the FEM circuitry for transmission.

In some embodiments, the RF circuitry may include a receive signal path and a transmit signal path. The receive signal path of the RF circuitry may include mixer circuitry, amplifier circuitry and filter circuitry. The transmit signal path of the RF circuitry may include filter circuitry and mixer circuitry. RF circuitry may also include synthesizer circuitry for synthesizing a frequency for use by the mixer circuitry of the receive signal path and the transmit signal path. In some embodiments, the mixer circuitry of the receive signal path may be configured to down-convert RF signals received from the FEM circuitry based on the synthesized frequency provided by synthesizer circuitry. The amplifier circuitry may be configured to amplify the down-converted signals and the filter circuitry may be a low-pass filter (LPF) or band-pass filter (BPF) configured to remove unwanted signals from the down-converted signals to generate output baseband signals. Output baseband signals may be provided to the baseband circuitry for further processing. In some embodiments, the output baseband signals may be zero-frequency baseband signals, although this is not a requirement. In some embodiments, mixer circuitry of the receive signal path may comprise passive mixers, although the scope of the embodiments is not limited in this respect.

In some embodiments, the mixer circuitry of the transmit signal path may be configured to up-convert input baseband signals based on the synthesized frequency provided by the synthesizer circuitry to generate RF output signals for the FEM circuitry. The baseband signals may be provided by the baseband circuitry and may be filtered by filter circuitry. The filter circuitry may include a low-pass filter (LPF), although the scope of the embodiments is not limited in this respect.

In some embodiments, the mixer circuitry of the receive signal path and the mixer circuitry of the transmit signal path may include two or more mixers and may be arranged for quadrature downconversion and/or upconversion respectively. In some embodiments, the mixer circuitry of the receive signal path and the mixer circuitry of the transmit signal path may include two or more mixers and may be arranged for image rejection (e.g., Hartley image rejection). In some embodiments, the mixer circuitry of the receive signal path and the mixer circuitry may be arranged for direct downconversion and/or direct upconversion, respectively. In some embodiments, the mixer circuitry of the receive signal path and the mixer circuitry of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry may include analog-to-digital converter (ADC) and digital-to-analog converter (DAC) circuitry and the baseband circuitry may include a digital baseband interface to communicate with the RF circuitry.

In some dual-mode embodiments, a separate radio IC circuitry may be provided for processing signals for each spectrum, although the scope of the embodiments is not limited in this respect.

In some embodiments, the synthesizer circuitry may be a fractional-N synthesizer or a fractional N/N+1 synthesizer, although the scope of the embodiments is not limited in this respect as other types of frequency synthesizers may be suitable. For example, synthesizer circuitry may be a delta-sigma synthesizer, a frequency multiplier, or a synthesizer comprising a phase-locked loop with a frequency divider.

The synthesizer circuitry may be configured to synthesize an output frequency for use by the mixer circuitry of the RF circuitry based on a frequency input and a divider control input. In some embodiments, the synthesizer circuitry may be a fractional N/N+1 synthesizer.

In some embodiments, frequency input may be provided by a voltage controlled oscillator (VCO), although that is not a requirement. Divider control input may be provided by either the baseband circuitry or the applications processor depending on the desired output frequency. In some embodiments, a divider control input (e.g., N) may be determined from a look-up table based on a channel indicated by the applications processor.

Synthesizer circuitry of the RF circuitry may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry may include an IQ/polar converter.

FEM circuitry may include a receive signal path which may include configured to operate on RF signals received from one or more antennas 210, amplify the received signals and provide the amplified versions of the received signals to the RF circuitry for further processing. FEM circuitry may also include a transmit signal path which may include circuitry configured to amplify signals for transmission provided by the RF circuitry for transmission by one or more of the one or more antennas.

In some embodiments, the FEM circuitry may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry). The transmit signal path of the FEM circuitry may include a power amplifier (PA) to amplify input RF signals (e.g., provided by RF circuitry), and one or more filters to generate RF signals for subsequent transmission (e.g., by one or more of the one or more antennas.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the UE is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

As above, 5G Wireless technology promises to be all-encompassing, addressing high-speed/high density data communications as well as low latency machine-machine communications. There may be many challenges in testing future 5G devices, in particular generation and analysis of 5G RF signals up to 12 GHz-15 GHz and up to about a 2 GHz bandwidth. Providing a low cost RF test capability while testing at high bandwidth (>800 MHz) with good performance may be difficult to realize. To achieve low cost for high volume production, it may be beneficial to have a high density of test instruments to occupy less floor space and reduce test time by testing more devices under test (DUTs) in parallel with independent instruments. Either the overall device (e.g., computer, cell phone) or portions of the circuitry, such as the processor, may undergo performance testing, prior to being provided for sale.

Although 5G RF signals up to the 12-15 GHz band may be used in the embodiments described below, similar methodology may be used for higher frequency bands (up to about 60 GHz, such as 28 GHz or 39 GHz) that may also be explored for use in the next generation of cellular devices. Such higher frequency bands may use one or more additional up-and-down-converters to produce an intermediate frequency signal and eventually a lower frequency signal. While a zero intermediate frequency (IF) architecture may be used in testing equipment to direct convert baseband in-phase/quadrature-phase (I/Q) signals generated through a high-speed analog-to-digital converter (ADC) or digital-to-analog converter (DAC), the zero IF architecture may have some drawbacks. The zero IF architecture may reduce the component count at the cost of IQ and quadrature imbalance in the I and Q signals as local oscillator (LO) leakages may be difficult to calibrate out. These imbalances may impair the device performance after testing.

In particular, there may be a large number of spurs and harmonics generated during the calibration process during testing. These spurs and harmonics may be difficult to filter out when close to the actual signal frequency. The inability to filter the spurs and harmonics may, in turn, degrade the performance of the test instrument. To provide adequate filtering when a large bandwidth is used (e.g., 2 GHz), the filter design of a testing instrument may also be increased complexity and/or unrealizable in some cases. In embodiments containing a large number (e.g., >12) of filter banks, a testing instrument may presently be limited to 1 RF Tx and Rx port in 2 PXIe slots with 1 GHz of bandwidth, operating up to 6 GHz. Moreover, any switching between the filter banks in such a testing instrument may introduce further glitches in the signal under test.

To combat this, signal under test from the 5G RF DUT may be separated into a plurality of frequency ranges, at least some of the frequencies of which may overlap. In some embodiments, the plurality of frequency ranges may be limited to two frequency ranges. In some embodiments, the 5G RF test device and signal may operate at a frequency of up to about 12 GHz or 15 GHz (i.e., having a central frequency of 12 GHz or 15 GHz) with a bandwidth of up to 2 GHz. In some embodiments, the frequency range may be separated into two frequency ranges; the first segment may cover a frequency range of less than about 3 GHz and use high-speed ADC/DAC's capable of 10-12 giga samples per second (GSPS) directly to generate and analyze the RF signal; the second segment may cover a frequency range of greater than about 3 GHz and employ a double conversion architecture for both the generation and analysis to keep the spurs and leakage far away from the desired signal. This latter design may allow a simple fixed filtering scheme to filter out all the undesired spurs and leakage while keeping the desired signal intact. Some overlapping of the two frequency segment may also allow a smooth transition from one segment to another when desired.

Figure 7A:
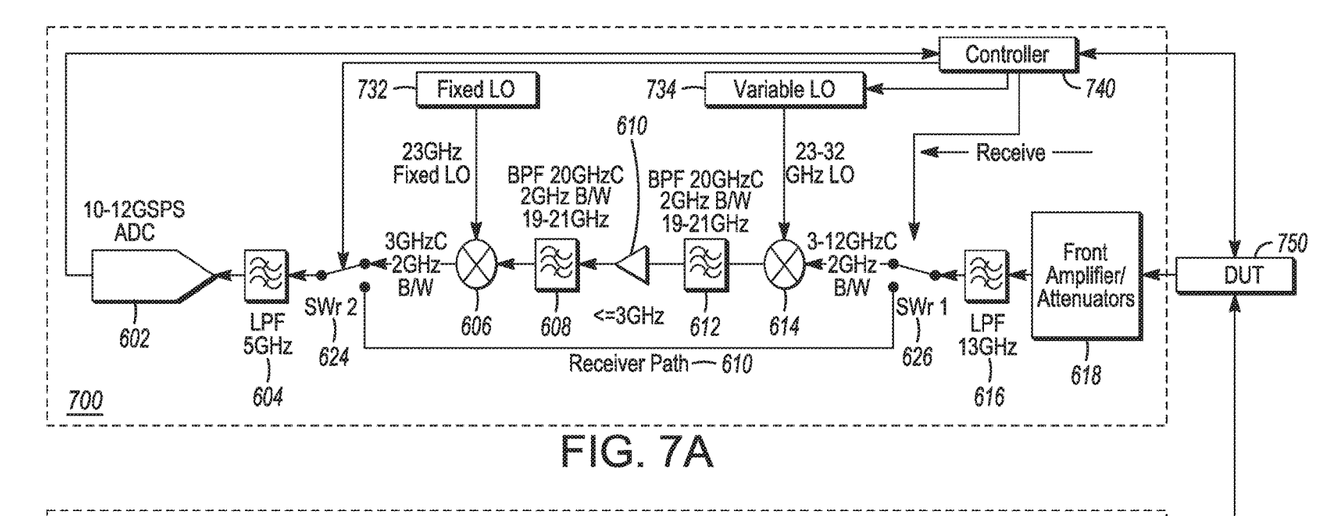
FIGS. 7(a) and 7(b) illustrate respectively a receiver path and transmit path of a testing device in accordance with some embodiments.
Figure 7B:
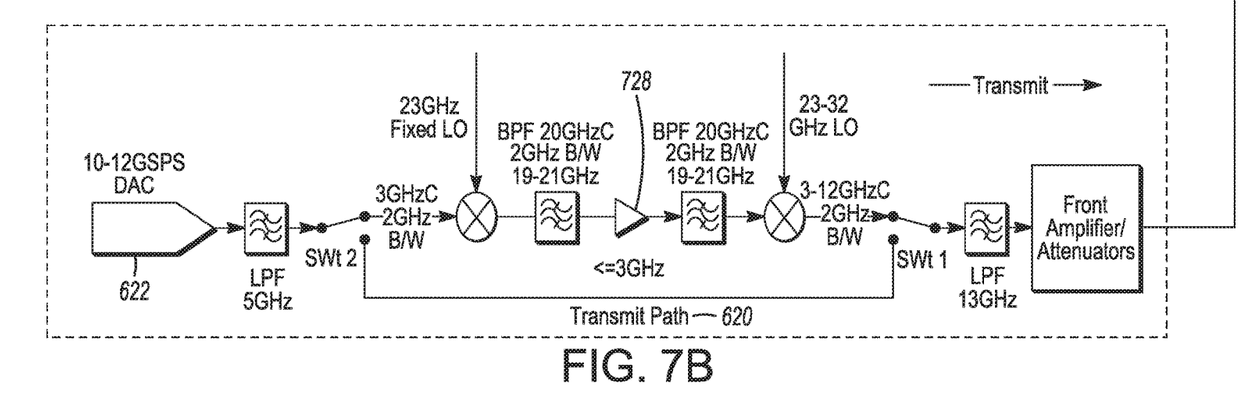

FIGS. 7(a) and 7(b) illustrate respectively a receiver path and transmit path of a testing device in accordance with some embodiments. FIGS. 7 (a) and (b) respectively show a testing device 700 having a receiver path 710, used in a reception mode, and transmit path 720, used in a transmission mode, that may be used to test the DUT 750 or specific circuitry within the DUT 750. The DUT 750 may be any of the devices shown in FIGS. 1-6 and may be external to the testing device 700. The testing device 700 may be a device whose primary purpose is to test DUTs, such as a spectrum analyzer. The testing device 700 may analyze the signal or may provide the signal to an external device for analysis. The analysis, wherever performed, may be used to determine whether or not the DUT 750 for example passes a predetermined set of characteristics to meet a minimum qualification to be sold or otherwise incorporated into circuitry to be put into the stream of commerce. If not, the DUT 750 may be removed and further testing may be performed by the testing device 700 or other devices to determine why the DUT 750 has not met the minimum qualification.

As shown in FIGS. 7 (a) and (b), the receiver path 710 and transmit path 720 may contain a number of similar elements. The elements in the paths of FIGS. 7 (a) and (b) may be entirely different or some may be shared among the paths.

These elements may include an ADC 702 or DAC 722, a pair of LPFs 704, 716, front end amplification circuitry 718, a pair of switches SWr1 and SWr2 724, 726 and double conversion circuitry. The double conversion circuitry may include a pair of mixers 706, 714 supplied respectively by a fixed LO 732 and a variable LO 734, a pair of BPFs 708, 712 and amplifiers 710, 728. Other circuitry in the testing device may be present but may not be shown for convenience.

For the receive path 710, the controller 740 may transmit a code word or other predetermined signal to the DUT 750. The controller 740 may control the circuitry described herein using instructions stored on a machine-readable medium, as described previously. The code word may cause the DUT 750 to transmit a signal at a predetermined frequency with a predetermined bandwidth. The predetermined frequency may be limited to below about 15 GHz (or 12 GHz, as indicated in FIGS. 7(*a*) and 7(*b*)) and the bandwidth may be limited to below about 2 GHz. The 12 GHz/15 GHz range may be designed to test the frequency range to be used in 5G communications.

The signal transmitted by the DUT 750 may be received by the testing device 700. The received signal from the DUT 750 may be amplified and/or attenuated respectively by amplifiers and/or attenuators in the front end amplification circuitry 718 to ensure that the signal has sufficient amplitude without being distorted when being filtered. The determination of whether to amplify or attenuate the signal may be dependent on the strength of the signal from the DUT 750. The resulting signal may be filtered by a first of the LPFs 716 (initial LPF) to allow only signals below about 1 GHz above the maximum frequency of the DUT 750. As shown, the initial LPF 716 may LPF signals up to about 13 GHz, although this may be changed to 16 GHz if the maximum frequency of the DUT 750 is about 15 GHz.

The filtered signal from the initial LPF 716, which in the embodiment shown may have a frequency of between about 3-12 GHz and have a 2 GHz bandwidth, may then be supplied to the first switch SWr1 726. Both SWr1 726 and SWr2 724 may be controlled by the controller 740 to operate in unison. The controller 740 may determine in which position to place SWr1 726 and SWr2 724 based on the frequency supplied by the DUT 750 as controlled by the controller 750. The control may be effected in sufficient time to minimize spurious signals (e.g., transients) introduced by switching of the SWr1 726 and SWr2 724.

If both SWr1 724 and SWr2 726 are closed to the lower (bypass) position, then the signal path may avoid the mixers 706, 714, BPFs 708, 712 and amplifier 710. The controller 750 may select the bypass position for a lower frequency signal (receiver or transmitter bypass mode). In some embodiments, this signal may be at most about 3 GHz, although this may be a predetermined value set in the controller 750. In this case, a received signal having a frequency of at most about 3 GHz RF signal may be able to directly pass from the initial LPF 716 through the 5 GHz LPF 704 (the IF filter 704). The IF filter 704 may act as a Nyquist filter for the high-speed ADC 702. The ADC 702 may, in some embodiments, operate at 10-12 GSPS, which permits adequate sampling of the analog RF signal to convert the analog RF signal to a digital signal for analysis by the controller 750 and/or other analysis circuitry (not shown) to permit the circuitry to determine whether the DUT 750 is operating correctly (e.g., providing the correct signal frequency). The circuitry may then indicate whether the DUT 750 passes or fails through communication (electronic, audible, visual or otherwise) to external circuitry or a user. A DUT 750 that fails, based on the indication, may be retested or may be discarded automatically by the other circuitry for later analysis to determine problems with the DUT 750.

For signals that are greater than about 3 GHz, the controller 750 may control both SWr1 724 and SWr2 726 may close to the upper position shown in FIG. 7*a*. The received signal may thus be connected to the double conversion path (receiver or transmitter direct mode). Instead of providing the received higher frequency signal directly to the IF filter 704, or directly downconverting the higher frequency signal to the Nyquist zone, the double conversion path may first upconvert the received signal to a high intermediate frequency (IF) signal to spread harmonics to a range outside the bandwidth of the signal (up to about 2 GHz).

The first step in the double conversion process is upconvert the received signal using a first stage mixer 714. In some embodiments, the first stage mixer 714 may receive a variable LO signal of between about 23 and 32 GHz, although as with all other values described herein, this value(s) is not meant to be exclusive. The variable LO signal may be supplied by a variable LO 734 whose output frequency is controlled by the controller 750. The controller 750 may control the variable LO 734 dependent on the frequency of the signal from the DUT 750 to obtain a mixed signal at a constant frequency.

In particular, the IF signal may have a frequency of about 20 GHz in some embodiments and as shown in FIG. 7(*a*). As the input frequency changes (from 3-12 GHz), the LO frequency may also change (from 23 to 32 GHz similarly). The mixed signal may maintain an output signal at a constant IF frequency so that a single fixed band-pass filter (BPF) 708 centered around about 20 GHz (as shown about 19-21 GHz with a 2 GHz bandwidth) may be sufficient to filter out the unwanted spurs and harmonics of the original signal, which as a result of the mixing now lie outside the BPF 708 pass band range. Note that a similar technique may be used for frequencies produced by the DUT 750 in the 5G frequency ranges higher that this (e.g., the 60 GHz band), mixing to produce a signal at a constant frequency.

Once the signal is mixed to nominally about 20 GHz, the signal may be supplied to the BPF 708. In some embodiments, multiple BPFs 708, 712 may be used. In this case, the upconverted signal may be filtered by an initial BPF 712 before being amplified by the amplifier 710. The resulting amplified signal may be supplied to a final BPF 708. The final BPF 708 may be used to remove unwanted signals introduced by the amplifier 710. The second stage mixer 706 may convert the IF signal to about a 3 GHz signal. The second stage mixer 706 be supplied with a fixed 23 GHz LO signal from a fixed LO 732. A fixed LO signal may be used rather than a variable LO signal as the signal supplied to the second stage mixer 706 may be constant (about 20 GHz) due to variable LO signal supplied to the first stage mixer 714.

The 3 GHz signal produced by the second stage mixer 706 may be supplied through SW2 724 to the IF filter 704. The IF filter 704 may be a LPF that has a smaller bandwidth than the initial LPF 716. In some embodiments, the IF filter 704 may LPF signals below about 5 GHz, the size used for the 3 GHz signal from the second stage mixer 706 along with the maximum 2 GHz bandwidth. In other embodiments, the cutoff frequency of the LPF may vary, depending on the input signal frequency and bandwidth. The 3 GHz signal produced may be within the $1^{st}$ Nyquist zone of the high-speed ADC 702.

Using this conversion may avoid the spurs and leakage signals that may plague traditional architecture. For example, if the incoming signal is 3.1 GHz and it is desired to downconvert into the 1$^{st}$ Nyquist zone directly, say 3 GHz, a mixer of the traditional architecture may leak the 3.1 GHz incoming signal to the output. This is, unfortunately, only 100 MHz away from the desired 3 GHz signal. A very sharp filter of this order is, even if possible, at best difficult to design and implement. The double conversion architecture, on the other hand, has a large frequency separation of incoming signal leakage at 3.1 Ghz and the IF of 20 GHz; thus, the IF filter 704 can be constructed to filter out the leakage. The same large frequency separation between IF leakage signal (20 GHz) and output signal (3 GHz) may be seen at the second stage mixer 706 and can be easily filtered out by the 5 GHz LPF 704.

In addition, in the double conversion architecture, the first mixer input image signal may now be at a much higher frequency—e.g., greater than about 43 GHz. Consequently, the 13 GHz initial LPF 716 may stop this image from entering the receiver path 710. The second stage mixer image may also be at about 43 GHz. Due to the IF filter 708, 714 that is centered around 20 GHz, the second stage image may be stopped from entering the mixer 706.

The transmit path 720 may be similar to the receiver path 710. In the transmit path 720, however, the DAC 722 may be used rather than the ADC 702, and the amplifier 728 may amplify signals in from the DAC 722 towards the DUT 750. The transmit path 720 may operate in a similar manner as the receiver path 710, with the output signal being processed by the DUT 750 and the resulting analysis provided to the controller 740, for example. This allows sharing of the fixed LO generation circuit and very high density packing of the testing device 700 containing the receiver path 710 and transmit path 720.

In embodiments in which the transmitter and receiver path circuitry is used, the amplifier 710 and the amplifier 728 may be disposed in parallel, as may the ADC 702 and DAC 722. Other set of switches may be disposed between the amplifier 710 and the amplifier 728. These other sets of switches may be controlled by the controller 740 such that the amplifier 710 is selected along with the ADC 702 (receive chain) and the amplifier 728 is selected along with the DAC 722 (transmit chain). In some embodiments, multiple front stage LPFs may be provided in parallel, selectable by the controller 740 based on the capabilities of the DUT 750.

Due to the large separation of the spurs and images from the useful signal, the double conversion architecture shown in FIGS. 7(*a*) and 7(*b*) may use a pair of fixed IF filters. This may be simpler and more efficient than using multiple (greater than 12) banks of filters in a zero-IF architecture. Moreover, the use of the double conversion architecture may allow 2 GHz bandwidth signals to be processed with low leakage and spurs, and thus high performance. The lack of a filter bank in the double conversion architecture may lead to avoiding transition glitches when switching among the filters. The double conversion architecture may also avoid the IQ imbalance issues that plague zero-IF architecture and for which additional circuits are used to compensate. Overall, the double conversion architecture shown in FIGS. 7(*a*) and 7(*b*) may lead to a large reduction of complexity and component count, as well as cost.

In some embodiments, 4-10 times more RF Tx and Rx ports may be included in the test device by using the double conversion architecture shown rather than a zero IF conversion within the same space. In addition, the cost of the test device may be reduced by the same 4-10× factor with better or equal performance. To analyze the DUT output, a spectrum analyzer currently used may have lower bandwidth and may upconvert a low frequency (DC-some cutoff frequency) signal from a zero-IF architecture instead of upconverting a high frequency (>3 GHz) signal. Such a spectrum analyzer may use a complex scheme to handle the high frequency range using Yttrium Iron Garnet (YIG) tuner. Moreover, a conventional spectrum analyzer may not have a transmit path.

Experimental results of a typical low frequency path RF signal directly generated through the DAC show clean signals without visible spurs and images (or spurs and images are below noise level). For a >3 GHz signal path, experimental results of the double converted RF signals similarly show clean with spurs and images largely below the noise level. Experimental results of two tone intermodulation show that the intermodulation is almost invisible or lower than the noise floor. This is in comparison with other traditional architectures, whose two tone intermodulation is much worse and visible.

EXAMPLES

Example 1 is an apparatus of a testing device, comprising: a receiver path of the testing device comprising: a pair of receiver switches, the receiver path configured to set the receiver switches in a receiver bypass position for reception of a signal from a device under test (DUT) of at most a first predetermined frequency and in a receiver direct position for reception of a signal of more than the first predetermined frequency; and first double conversion circuitry to which the signal of more than the first predetermined frequency is introduced and that is configured to convert the signal of more than the first predetermined frequency to a signal of the first predetermined frequency, the signal of the first predetermined frequency and the signal of at most the first predetermined frequency supplied to one of the receiver switches; and a transmitter path comprising a pair of transmitter switches in a transmitter bypass position for transmission of a signal to the DUT of at most the first predetermined frequency and in a transmitter direct position for transmission of a signal of more than the first predetermined frequency through second double conversion circuitry that is configured to convert the signal of more than the first predetermined frequency to the signal of the first predetermined frequency, the signal of at most the first predetermined frequency and the signal of more than the first predetermined frequency supplied to one of the transmitter switches.

In Example 2, the subject matter of Example 1 includes, wherein: the receiver path further comprises receiver front end amplification circuitry, an analog-to-digital converter (ADC) and first and second receiver lowpass filters (LPFs), the first receiver LPF connected between a first of the receiver pair of switches and the DUT, the second receiver LPF connected between a second of the receiver pair of switches and the ADC, the first of the receiver pair of switches more proximate than the second of the receiver pair of switches to the receiver front end amplification circuitry, and the transmitter path further comprises transmitter front end amplification circuitry, a digital-to-analog converter (DAC) and first and second transmitter LPFs, the first transmitter LPF connected between a first of the transmitter pair of switches and the DUT, the second transmitter LPF connected between a second of the transmitter pair of switches and the DAC, the first of the transmitter pair of switches more proximate than the transmitter of the receiver pair of switches to the transmitter front end amplification circuitry.

In Example 3, the subject matter of Example 2 includes, wherein: the receiver front end amplification circuitry and transmitter front end amplification circuitry are the same amplification circuitry, the first and second receiver LPFs and first and second transmitter LPFs, respectively, are the same LPFs, and the receiver pair of switches and transmitter pair of switches are the same pair of switches.

In Example 4, the subject matter of Examples 2-3 includes, wherein: the first receiver and transmitter LPFs have a cutoff frequency respectively higher than that of the second receiver and transmitter LPFs.

In Example 5, the subject matter of Example 4 includes, wherein: the cutoff frequency of the second receiver and transmitter LPFs is about the first predetermined frequency plus a maximum bandwidth of the signal from the DUT.

In Example 6, the subject matter of Example 5 includes, wherein: the cutoff frequency of the first receiver and transmitter LPFs is about 13 GHz or 16 GHz, and the cutoff frequency of the second receiver and transmitter LPFs is about 5 GHz.

In Example 7, the subject matter of Examples 1-6 includes, wherein: the signal of the first predetermined frequency is supplied to the second of the receiver and transmitter switches, each of the first and second double conversion circuitry comprises a pair of mixers and a pair of bandpass filters (BPFs) connected between the pair of mixers and an amplifier connected between the pair of BPFs, the pair of mixers in the first double conversion circuitry is configured to upconvert the signal of more than the first predetermined frequency to a second predetermined frequency and downconvert the signal of the second predetermined frequency to a third predetermined frequency, and the pair of mixers in the second double conversion circuitry is configured to upconvert the signal of the third first predetermined frequency to the second predetermined frequency and downconvert the signal of the second predetermined frequency to the more than the first predetermined frequency.

In Example 8, the subject matter of Example 7 includes, wherein: the third predetermined frequency is the first predetermined frequency.

In Example 9, the subject matter of Examples 7-8 includes, wherein: each pair of mixers in the first and second double conversion circuitry comprises a first mixer to convert between the signal of more than the first predetermined frequency and the second predetermined frequency and a second mixer to convert between the signal of the second predetermined frequency and the third predetermined frequency, a variable local oscillator (LO) signal is supplied to the first mixer, a frequency of the variable LO signal dependent on a frequency of the signal of more than the first predetermined frequency, and a fixed LO signal is supplied to the second mixer.

In Example 10, the subject matter of Examples 8-9 includes, wherein: each pair of BPFs has the same passband.

In Example 11, the subject matter of Example 10 includes, wherein: the passband is 19-21 GHz and the second predetermined frequency is about 20 GHz.

Example 12 is a method for operating a testing apparatus, the method comprising: controlling, using a controller in the testing apparatus, a device under test (DUT) to transmit a signal; switching reception between a receiver bypass position used when the signal has at most a first predetermined frequency and a receiver direct position when the signal has more than the first predetermined frequency, double converting the signal of more than the first predetermined frequency by upconverting the signal to an intermediate frequency (IF) signal before downconverting the IF signal to a signal of the first predetermined frequency; bypassing double conversion of the signal when the signal has at most the first predetermined frequency; and supplying to an analog-to-digital converter (ADC) the signal of the first predetermined frequency or the signal of at most the first converted frequency, depending on whether the receiver bypass position or receiver direct position is being used, the signal from the ADC used to evaluate the DUT.

In Example 13, the subject matter of Example 12 includes, converting at a digital-to-analog converter (DAC) a digital signal to the signal of the first predetermined frequency or the signal of at most the first converted frequency, depending on which of a transmitter bypass position or a transmitter direct position is being used; double converting the signal of the first predetermined frequency by upconverting the signal of the first predetermined frequency to the IF signal before downconverting the IF signal to the signal of the more than the first predetermined frequency; bypassing double conversion of the signal from the DAC when the signal from the DAC has at most the first predetermined frequency; and supplying the signal of more than the first predetermined frequency or the signal of at most the first converted frequency to the DUT, depending on which of the transmitter bypass position or transmitter direct position is being used.

In Example 14, the subject matter of Examples 12-13 includes, amplifying or attenuating the signal from the DUT prior to lowpass filtering the signal from the DUT to produce a lowpass filtered signal to limit distortion of the signal; bandpass filtering the lowpass filtered signal after upconverting the lowpass filtered signal and prior to downcoverting the IF signal; amplifying a bandpass filtered signal prior to downcoverting the IF signal; and lowpass filtering the signal of the first predetermined frequency to produce another lowpass filtered signal supplied to the ADC.

In Example 15, the subject matter of Example 14 includes, wherein: the bandpass filtering the lowpass filtered signal after upconverting the lowpass filtered signal and prior to downcoverting the IF signal uses a bandpass filter having a same band.

In Example 16, the subject matter of Examples 14-15 includes, wherein: the lowpass filtering of the signal from the DUT has a higher cutoff frequency than the lowpass filtering of the signal of the first predetermined frequency.

In Example 17, the subject matter of Examples 12-16 includes, wherein: upconverting the signal to the IF signal comprises using a variable local oscillation (LO) signal that has a frequency dependent on the more than the first predetermined frequency to upconvert the signal of more than the first predetermined frequency to the same IF independent of the more than the first predetermined frequency, and downconverting the IF signal to the signal of the first predetermined frequency comprises using a fixed LO signal.

Example 18 is at least one machine-readable medium containing instructions for operating an apparatus of a testing device that configure the apparatus to; control a device under test (DUT) to transmit a DUT signal in a testing device reception mode and, in a testing device transmission mode, to receive a testing device signal from the testing device; switch reception between a receiver bypass mode when the DUT or testing device signal has at most a first predetermined frequency and a receiver direct mode when the DUT or testing device signal has more than the first predetermined frequency; double convert the DUT or testing device signal of more than the first predetermined frequency by; in the testing device reception mode, upconversion of the DUT signal to an intermediate frequency (IF) signal before downconversion of the IF signal to a signal of the first predetermined frequency; and in the testing device transmission mode, upconversion of the signal of the first predetermined frequency to the IF signal before downconversion of the IF signal to the testing device signal; and bypass double conversion of the DUT or testing device signal when the DUT or testing device signal has at most the first predetermined frequency.

In Example 19, the subject matter of Example 18 includes, wherein the instructions further configure the apparatus to; in the testing device reception mode; amplify or attenuate the DUT signal prior to lowpass filtering the DUT signal; lowpass filter the DUT signal; lowpass filter the signal of the first predetermined frequency or the signal of at most the first converted frequency, dependent on whether the testing device is in the receiver bypass mode or receiver direct mode; and convert the signal of the first predetermined frequency or the signal of at most the first converted frequency after lowpass filtering to a digital DUT signal; in the testing device transmission mode: convert a digital testing device signal to the signal of the first predetermined frequency or the signal of at most the first converted frequency; lowpass filter the signal of the first predetermined frequency or the signal of at most the first converted frequency dependent on whether the testing device is in a transmitter bypass mode or transmitter direct mode; lowpass filter the testing device signal: and amplify or attenuate the testing device signal after lowpass filtering the testing device signal.

In Example 20, the subject matter of Examples 18-19 includes, wherein the instructions further configure the apparatus to; in the testing device reception mode and testing device transmission mode, bandpass filter the IF signal prior to and after amplification of the IF signal using bandpass filters having a same center frequency and bandwidth; and use a variable local oscillation (LO) signal that has a frequency dependent on the more than the first predetermined frequency to, in the testing device reception mode, upconvert the DUT signal to the IF signal and, in the testing device transmission mode, downconvert the IF signal to the testing device signal, such that an IF is maintained independent of the more than the first predetermined frequency, and use a fixed LO signal to, in the testing device reception mode, downconvert the IF signal to the signal of the first predetermined frequency and, in the testing device transmission mode, upconvert the signal of the first predetermined frequency to the IF signal.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a testing device, comprising:
   a receiver path of the testing device comprising:
      a pair of receiver switches, the receiver path configured to set the receiver switches in a receiver bypass position for reception of a signal from a device under test (DUT) of at most a first predetermined frequency and in a receiver direct position for reception of a signal of more than the first predetermined frequency; and
      first double conversion circuitry to which the signal of more than the first predetermined frequency is introduced and that is configured to convert the signal of more than the first predetermined frequency to a signal of the first predetermined frequency, the signal of the first predetermined frequency and the signal of at most the first predetermined frequency supplied to one of the receiver switches; and
   a transmitter path comprising a pair of transmitter switches in a transmitter bypass position for transmission of a signal to the DUT of at most the first predetermined frequency and in a transmitter direct position for transmission of a signal of more than the first predetermined frequency through second double conversion circuitry that is configured to convert the signal of more than the first predetermined frequency to the signal of the first predetermined frequency, the signal of at most the first predetermined frequency and the signal of more than the first predetermined frequency supplied to one of the transmitter switches.

2. The apparatus of claim 1, wherein:
   the receiver path further comprises receiver front end amplification circuitry, an analog-to-digital converter (ADC) and first and second receiver lowpass filters (LPFs), the first receiver LPF connected between a first of the receiver pair of switches and the DUT, the second receiver LPF connected between a second of the receiver pair of switches and the ADC, the first of the receiver pair of switches more proximate than the second of the receiver pair of switches to the receiver front end amplification circuitry, and the transmitter path further comprises transmitter front end amplification circuitry, a digital-to-analog converter (DAC) and first and second transmitter LPFs, the first transmitter LPF connected between a first of the transmitter pair of switches and the DUT, the second transmitter LPF connected between a second of the transmitter pair of switches and the DAC, the first of the transmitter pair of switches more proximate than the transmitter of the receiver pair of switches to the transmitter front end amplification circuitry.

3. The apparatus of claim 2, wherein:
the receiver front end amplification circuitry and transmitter front end amplification circuitry are the same amplification circuitry,
the first and second receiver LPFs and first and second transmitter LPFs, respectively, are the same LPFs, and
the receiver pair of switches and transmitter pair of switches are the same pair of switches.

4. The apparatus of claim 2, wherein:
the first receiver and transmitter LPFs have a cutoff frequency respectively higher than that of the second receiver and transmitter LPFs.

5. The apparatus of claim 4, wherein:
the cutoff frequency of the second receiver and transmitter LPFs is about the first predetermined frequency plus a maximum bandwidth of the signal from the DUT.

6. The apparatus of claim 5, wherein:
the cutoff frequency of the first receiver and transmitter LPFs is about 13 GHz or 16 GHz, and
the cutoff frequency of the second receiver and transmitter LPFs is about 5 GHz.

7. The apparatus of claim 1, wherein:
the signal of the first predetermined frequency is supplied to the second of the receiver and transmitter switches,
each of the first and second double conversion circuitry comprises a pair of mixers and a pair of bandpass filters (BPFs) connected between the pair of mixers and an amplifier connected between the pair of BPFs,
the pair of mixers in the first double conversion circuitry is configured to upconvert the signal of more than the first predetermined frequency to a second predetermined frequency and downconvert the signal of the second predetermined frequency to a third predetermined frequency, and
the pair of mixers in the second double conversion circuitry is configured to upconvert the signal of the third first predetermined frequency to the second predetermined frequency and downconvert the signal of the second predetermined frequency to the more than the first predetermined frequency.

8. The apparatus of claim 7, wherein:
the third predetermined frequency is the first predetermined frequency.

9. The apparatus of claim 7, wherein:
each pair of mixers in the first and second double conversion circuitry comprises a first mixer to convert between the signal of more than the first predetermined frequency and the second predetermined frequency and a second mixer to convert between the signal of the second predetermined frequency and the third predetermined frequency,
a variable local oscillator (LO) signal is supplied to the first mixer, a frequency of the variable LO signal dependent on a frequency of the signal of more than the first predetermined frequency, and
a fixed LO signal is supplied to the second mixer.

10. The apparatus of claim 8, wherein:
each pair of BPFs has the same passband.

11. The apparatus of claim 10, wherein:
the passband is 19-21 GHz and the second predetermined frequency is about 20 GHz.

12. A method for operating a testing apparatus, the method comprising:
controlling, using a controller in the testing apparatus, a device under test (DUT) to transmit a signal;
switching reception between a receiver bypass position used when the signal has at most a first predetermined frequency and a receiver direct position when the signal has more than the first predetermined frequency;
double converting the signal of more than the first predetermined frequency by upconverting the signal to an intermediate frequency (IF) signal before downconverting the IF signal to a signal of the first predetermined frequency;
bypassing double conversion of the signal when the signal has at most the first predetermined frequency; and
supplying to an analog-to-digital converter (ADC) the signal of the first predetermined frequency or the signal of at most the first converted frequency, depending on whether the receiver bypass position or receiver direct position is being used, the signal from the ADC used to evaluate the DUT.

13. The method of claim 12, further comprising:
converting at a digital-to-analog converter (DAC) a digital signal to the signal of the first predetermined frequency or the signal of at most the first converted frequency, depending on which of a transmitter bypass position or a transmitter direct position is being used;
double converting the signal of the first predetermined frequency by upconverting the signal of the first predetermined frequency to the IF signal before downconverting the IF signal to the signal of the more than the first predetermined frequency;
bypassing double conversion of the signal from the DAC when the signal from the DAC has at most the first predetermined frequency; and
supplying the signal of more than the first predetermined frequency or the signal of at most the first converted frequency to the DUT, depending on which of the transmitter bypass position or transmitter direct position is being used.

14. The method of claim 12, further comprising:
amplifying or attenuating the signal from the DUT prior to lowpass filtering the signal from the DUT to produce a lowpass filtered signal to limit distortion of the signal;
bandpass filtering the lowpass filtered signal after upconverting the lowpass filtered signal and prior to downcoverting the IF signal;
amplifying a bandpass filtered signal prior to downcoverting the IF signal; and
lowpass filtering the signal of the first predetermined frequency to produce another lowpass filtered signal supplied to the ADC.

15. The method of claim 14, wherein:
the bandpass filtering the lowpass filtered signal after upconverting the lowpass filtered signal and prior to downcoverting the IF signal uses a bandpass filter having a same band.

16. The method of claim 14, wherein:
the lowpass filtering of the signal from the DUT has a higher cutoff frequency than the lowpass filtering of the signal of the first predetermined frequency.

17. The method of claim 12, wherein:
- upconverting the signal to the IF signal comprises using a variable local oscillation (LO) signal that has a frequency dependent on the more than the first predetermined frequency to upconvert the signal of more than the first predetermined frequency to the same IF independent of the more than the first predetermined frequency, and
- downconverting the IF signal to the signal of the first predetermined frequency comprises using a fixed LO signal.

18. At least one non-transitory machine-readable medium containing instructions for operating an apparatus of a testing device that configure the apparatus to:
- control a device under test (DUT) to transmit a DUT signal in a testing device reception mode and, in a testing device transmission mode, to receive a testing device signal from the testing device;
- switch reception between a receiver bypass mode when the DUT or testing device signal has at most a first predetermined frequency and a receiver direct mode when the DUT or testing device signal has more than the first predetermined frequency;
- double convert the DUT or testing device signal of more than the first predetermined frequency by:
  - in the testing device reception mode, upconversion of the DUT signal to an intermediate frequency (IF) signal before downconversion of the IF signal to a signal of the first predetermined frequency; and
  - in the testing device transmission mode, upconversion of the signal of the first predetermined frequency to the IF signal before downconversion of the IF signal to the testing device signal; and
- bypass double conversion of the DUT or testing device signal when the DUT or testing device signal has at most the first predetermined frequency.

19. The medium of claim 18, wherein the instructions further configure the apparatus to:
- in the testing device reception mode:
  - amplify or attenuate the DUT signal prior to lowpass filtering the DUT signal;
  - lowpass filter the DUT signal;
  - lowpass filter the signal of the first predetermined frequency or the signal of at most the first converted frequency, dependent on whether the testing device is in the receiver bypass mode or receiver direct mode; and
  - convert the signal of the first predetermined frequency or the signal of at most the first converted frequency after lowpass filtering to a digital DUT signal;
- in the testing device transmission mode:
  - convert a digital testing device signal to the signal of the first predetermined frequency or the signal of at most the first converted frequency;
  - lowpass filter the signal of the first predetermined frequency or the signal of at most the first converted frequency dependent on whether the testing device is in a transmitter bypass mode or transmitter direct mode;
  - lowpass filter the testing device signal; and
  - amplify or attenuate the testing device signal after lowpass filtering the testing device signal.

20. The medium of claim 18, wherein the instructions further configure the apparatus to:
- in the testing device reception mode and testing device transmission mode, bandpass filter the IF signal prior to and after amplification of the IF signal using bandpass filters having a same center frequency and bandwidth; and
- use a variable local oscillation (LO) signal that has a frequency dependent on the more than the first predetermined frequency to, in the testing device reception mode, upconvert the DUT signal to the IF signal and, in the testing device transmission mode, downconvert the IF signal to the testing device signal, such that an IF is maintained independent of the more than the first predetermined frequency, and
- use a fixed LO signal to, in the testing device reception mode, downconvert the IF signal to the signal of the first predetermined frequency and, in the testing device transmission mode, upconvert the signal of the first predetermined frequency to the IF signal.

* * * * *